(12) United States Patent
Edrington et al.

(10) Patent No.: US 6,745,592 B1
(45) Date of Patent: Jun. 8, 2004

(54) APPARATUS AND METHOD FOR DISPENSING A FROZEN ALCOHOLIC BEVERAGE

(75) Inventors: Michael J. Edrington, Louisville, KY (US); Richard L. Sipp, Crestwood, KY (US)

(73) Assignee: Grindmaster Corporation, Louisville, KY (US)

( * ) Notice: Subject to any disclaimer, the term of this patent is extended or adjusted under 35 U.S.C. 154(b) by 0 days.

(21) Appl. No.: 10/295,722

(22) Filed: Nov. 15, 2002

Related U.S. Application Data

(63) Continuation-in-part of application No. 10/000,793, filed on Nov. 1, 2001, now Pat. No. 6,622,510.
(60) Provisional application No. 60/333,230, filed on Nov. 16, 2001.

(51) Int. Cl.[7] .................................................. A23P 1/00
(52) U.S. Cl. ......................................... 62/342; 426/524
(58) Field of Search ............................ 62/68, 177, 342, 62/389; 222/146.6; 426/524

(56) References Cited

U.S. PATENT DOCUMENTS

| | | | |
|---|---|---|---|
| 2,194,775 A | 3/1940 | Stadtfeld | |
| 3,359,748 A | 12/1967 | Booth | |
| 3,379,029 A | 4/1968 | King | |
| 3,979,024 A | 9/1976 | Hoppe | |
| 3,995,770 A | 12/1976 | Schwitters | |
| 4,022,031 A | 5/1977 | Calim | |
| 4,201,558 A | 5/1980 | Schwitters et al. | |
| 4,440,795 A | 4/1984 | Goldstein et al. | |
| 4,448,036 A | 5/1984 | Iannelli | |
| 4,704,877 A * | 11/1987 | Selcukoglu | 62/532 |
| 4,869,396 A | 9/1989 | Horino et al. | |
| 5,304,384 A | 4/1994 | Murray et al. | |
| 5,463,877 A | 11/1995 | Young et al. | |
| 5,615,559 A | 4/1997 | Kress et al. | |
| 5,869,114 A | 2/1999 | Murray et al. | |
| 6,434,966 B1 * | 8/2002 | Cunha et al. | 62/389 |
| 6,511,693 B2 * | 1/2003 | Jones | 426/565 |
| 2002/0083730 A1 | 7/2002 | Edrington et al. | |
| 2003/0161923 A1 * | 8/2003 | Holland et al. | 426/524 |

* cited by examiner

*Primary Examiner*—William E. Tapolcai
(74) *Attorney, Agent, or Firm*—Stites & Harbison, PLLC; David W. Nagle, Jr.; Mandy V. Wilson

(57) ABSTRACT

An apparatus and method for dispensing a frozen alcoholic beverage in which an alcoholic beverage component is mixed with at least one other liquid component prior to freezing and dispensing as a frozen beverage product. The individual beverage components flow through the dispensing apparatus from separate containers through separate pressure-controlled component feed systems, exiting into a common mixing area where they form a single beverage product. This resulting product then enters the freezing and dispensing system where it is maintained at a pressure of about 20–27 psi while being processed into a frozen alcoholic beverage product until it is dispensed.

29 Claims, 8 Drawing Sheets

APPARATUS AND METHOD FOR DISPENSING A FROZEN ALCOHOLIC BEVERAGE

CROSS REFERENCES TO RELATED APPLICATIONS

This application claims priority from U.S. Provisional Application Serial No. 60/333,230 filed Nov. 16, 2001, and is a continuation-in-part of commonly assigned and U.S. patent application Ser. No. 10/000,793 filed Nov. 1, 2001 now U.S. Pat. No. 6,622,510. The entire disclosures contained in U.S. Provisional Application Serial No. 60/333,230 and U.S. application Ser. No. 10/000,793 are incorporated herein by this reference.

BACKGROUND OF THE INVENTION

The present invention relates to an apparatus and method for dispensing a frozen alcoholic beverage, and, more particularly, to an apparatus and method in which an alcoholic beverage component is mixed with another flavored liquid component and water prior to freezing and dispensing as a single beverage product.

Frozen beverage dispensers are common in the prior art, with the primary function of such dispensers being to mix water and a flavored component, freeze the mixture, and then dispense the frozen beverage product with a slush-like consistency. For example, in a typical frozen carbonated beverage machine (commonly referred to as an "FCB" machine"), water is first carbonated with carbon dioxide. The carbonated water is mixed with a syrup to form a carbonated beverage mixture, and then the mixture is frozen for subsequent dispensing.

With the popularity of frozen alcoholic beverages, it is desirable to provide for similar mixing and dispensing of frozen alcoholic beverages. However, a problem with freezing alcoholic beverages is that alcohol reduces the freezing point of the beverage product. Furthermore, it is important that the alcohol content be strictly controlled in order to ensure the beverage product is palatable and that the alcohol content is within prescribed limits.

Commonly assigned and co-pending U.S. patent application Ser. No. 10/000,793 describes the freezing and dispensing of an alcoholic beer product. Specifically, beer is provided in a sealed, refrigerated storage container under pressure. The beer is fed from the storage container to a freezing chamber through a sealed delivery system for freezing, and the frozen beer can then be dispensed from the chamber. The resulting frozen beer product preferably has a slush consistency. Although the described method and system may be appropriate for a single alcoholic beverage, it does not provide for the dispensing of a frozen "mixed drink," in which an alcoholic beverage is mixed with a syrup or similar ingredient and water.

It is therefore a paramount object of the present invention to provide an apparatus and method for dispensing a frozen alcoholic beverage that allows for the mixing of multiple beverage components into a beverage products that is then frozen and dispensed.

This and other objects and advantages of the present invention will become apparent upon a reading of the following description.

SUMMARY OF THE INVENTION

The present invention is an apparatus and method for dispensing a frozen alcoholic beverage in which an alcoholic beverage component is mixed with at least one other liquid component prior to freezing and dispensing as a frozen beverage product. A preferred dispensing apparatus is comprised of two major components: a base cart, which contains all of the components needed to pump and mix the beverage components prior to freezing to form a single beverage product; and a freezing and dispensing system.

An ingredient cabinet in the front portion of the base cart stores separate containers of the different beverage components, each of which is in liquid communication with a respective component feed system. These component feed systems are located on a mixing panel in a rear portion of the base cart, each such component feed system including tubing and various valves for controlling the flow of each beverage component.

After the individual beverage components—an alcoholic beverage component, a flavored liquid component, and water—have passed through the respective component feed systems of the mixing panel, the components are introduced into and mixed in a common conduit or a mixing area. The mixed beverage then exits the base cart and is introduced into the freezing and dispensing system.

The preferred freezing and dispensing system contains all of the components needed to freeze and dispense a frozen alcoholic beverage with a desired consistency. The system includes a standard freezer that is commonly used in frozen beverage dispensers, including a freezing and dispensing barrel. The freezing and dispensing system also includes an accumulator which receives mixed beverage from the mixing area. The accumulator also has an outlet in liquid communication with the freezing and dispensing barrel to introduce mixed beverage into the freezing and dispensing barrel. The freezing and dispensing barrel has a dispensing valve at a distal end thereof operated by a handle. When the dispensing handle is manually activated, it causes the dispensing valve to open. The pressure in both the freezing and dispensing barrel and the accumulator is higher then atmospheric pressure; thus, when the dispensing valve is opened, the frozen beverage product is expelled from through the dispensing valve and out of the dispenser. Simultaneous with this dispensing action, a volume of mixed beverage is drawn through the accumulator and into the freezing and dispensing barrel for freezing, resulting in a drop in pressure. A pressure switch, interposed between the accumulator and the freezing and dispensing barrel, is activated when the pressure falls below approximately 20–27 psi, thus causing the component feed systems to replenish the supply of the mixed beverage.

The preferred dispenser may also be equipped with "mix-out" switches that are activated when a particular beverage component has run out. Activation of a "mix-out" switch results in the prevention of the flow of the beverage components and triggers an alarm, signaling that a beverage component needs to be replenished.

The preferred dispenser may also allow for the collection of samples of the mixed beverage or any components thereof.

DETAILED DESCRIPTION OF THE INVENTION

The present invention is an apparatus and method for dispensing a frozen alcoholic beverage in which an alcoholic beverage component is mixed with another flavored liquid component and water prior to freezing and dispensing as a frozen beverage product.

Figure 1:
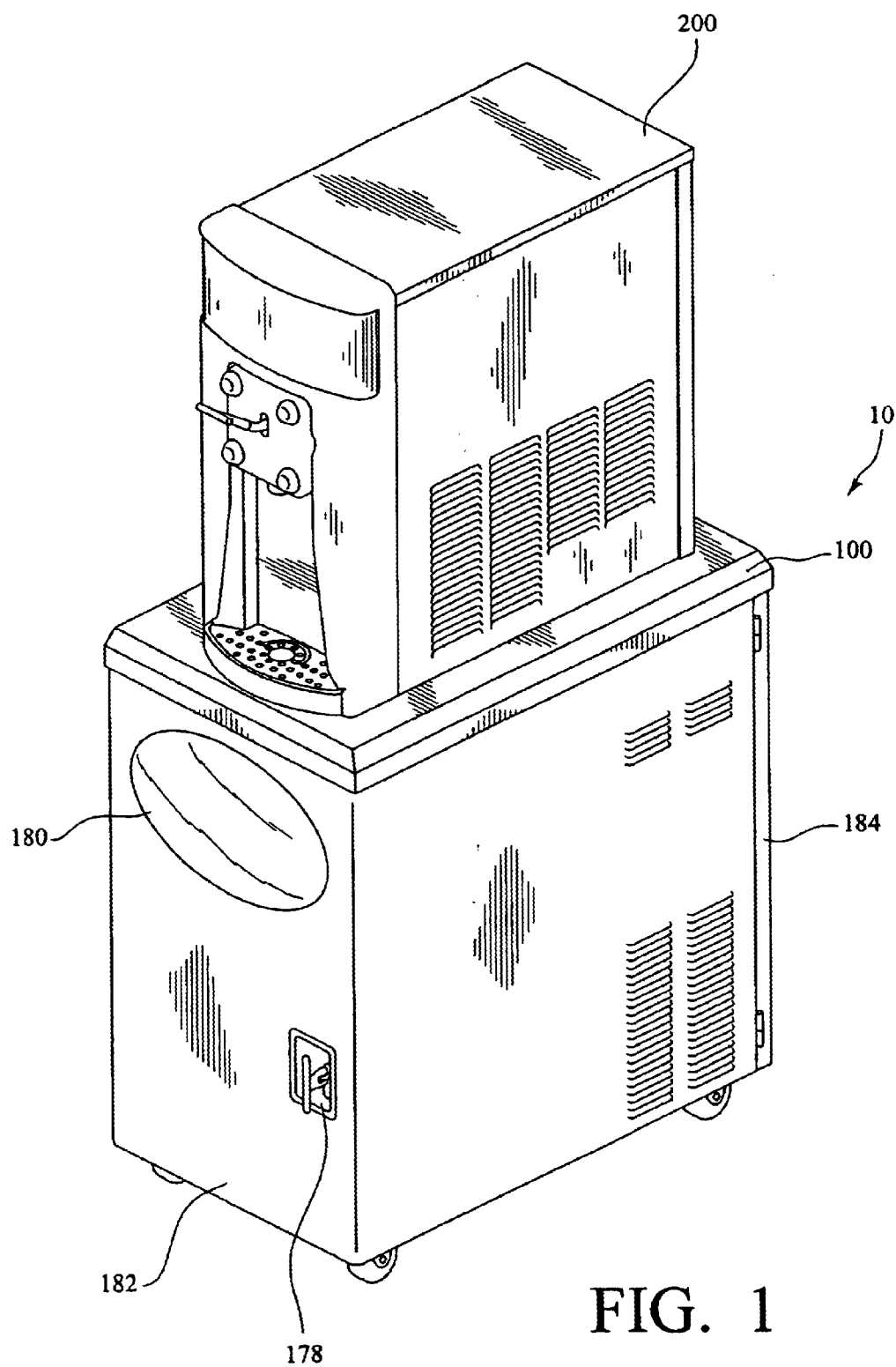
FIG. 1 is a perspective view of a preferred dispenser made in accordance with the present invention.

FIG. 1 is a perspective view of a preferred frozen alcoholic beverage dispenser 10 made in accordance with the present invention. The preferred dispenser 10 is portable and preferably comprised of two major components: a base cart 100 and a freezing and dispensing system 200. The base cart 100 contains all of the components needed to pump and mix the beverage components prior to freezing to form a single beverage product. The freezing and dispensing system 200 contains all of the components needed to freeze and then dispense the frozen beverage product.

Figure 2:
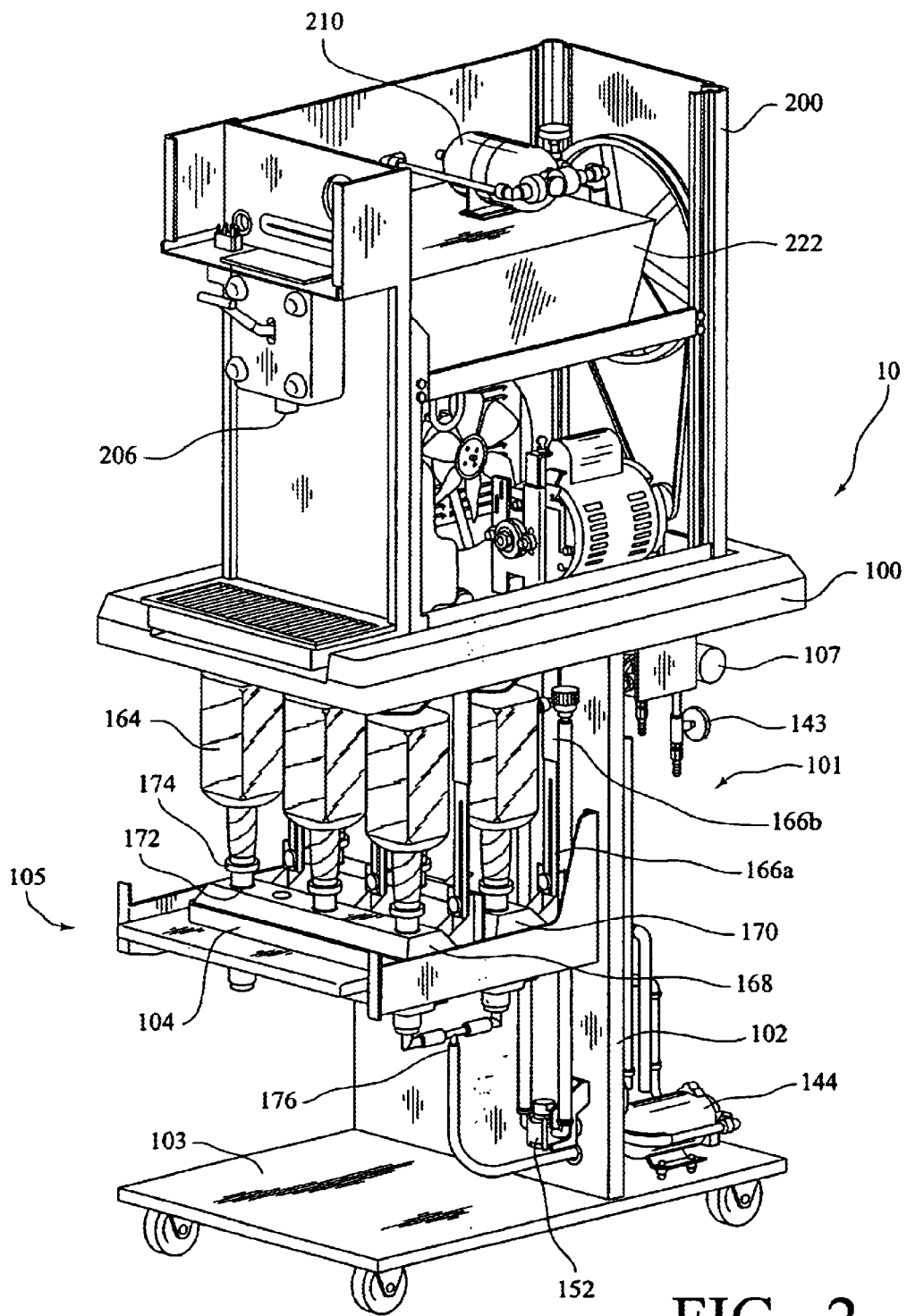
FIG. 2 is a front perspective view of the dispenser of FIG. 1, with the outer housing of the dispenser removed to illustrate the internal components of the dispenser.

FIG. 2 is an alternate perspective view of the preferred dispenser 10 with the outer housing of the dispenser 10 removed to illustrate the internal components. Referring first to the components of the base cart 100, the base cart 100 has a front portion and a rear portion that are separated by a partition 102. The front portion serves as an ingredient cabinet 105. Referring again to FIG. 1, the ingredient cabinet 105 is normally accessible through a front door 182 that is preferably secured by a lock 178. However, when the front door 182 of the base cart 100 is closed, the contents of the ingredient cabinet 105 are still preferably viewable through a window 180 in the front door 182 of the base cart 100.

The rear portion of the base cart houses a mixing panel 101, the importance of which will be described in detail below. The mixing panel is normally accessible through a rear door 184 (as shown in FIG. 1) that is also preferably secured by a lock (not shown).

Referring still to FIG. 2, the front portion of the base cart 100 serves as an ingredient cabinet 105 and includes an alcohol storage rack 104 and a flavorant storage area 103. The flavorant storage area 103 is used to store containers containing flavored liquid components, for example, bag-in-box syrup containers (not shown). Indeed, it is contemplated and preferred that multiple containers may be accommodated in the flavorant storage area 103. In this regard, and as illustrated in the flow diagram of FIG. 8, when two syrup containers 148, 150 are stored in the flavorant storage area 103, each may be placed in liquid communication with a transfer valve 152, preferably with common low-density polyethylene tubing. Such a transfer valve 152 causes syrup to be drawn from the first container 148 until the syrup in that container 148 is exhausted, at which time the transfer valve 152 automatically switches to allow syrup to be drawn from the second container 150.

Regardless of the number of syrup containers stored in the flavorant storage area 103, syrup or a similar flavored liquid component is carried through low-density polyethylene tubing or a similar conduit from the ingredient cabinet 105, through the base cart partition 102, and to the mixing panel 101 where it may be combined with other components to form a single beverage product, as is described in further detail below.

Referring again to FIG. 2, the alcoholic beverage component of the single beverage product could be any type of alcoholic beverage, including, for example, bourbon, whiskey, vodka, or tequila. Of course, any brand or type of alcoholic beverage could be used. For purposes of simplifying the description that follows, the alcoholic beverage component is simply referred to as "alcohol."

In the preferred dispenser 10 described herein, alcohol is preferably stored in the ingredient cabinet 105 through use of an alcohol storage rack 104, which can hold multiple individual bottles 164 of alcohol. The preferred storage rack 104 is manufactured and distributed by Berg Company, LLC of Madison, Wis. In general, the storage rack 104 includes at least one reservoir 168 with multiple openings 172 into the reservoir 168, each capable of receiving the neck of a bottle 164. In this manner, a bottle 164 can be inverted and inserted into a particular opening such that alcohol is allowed to flow out of the bottle 164 and into the reservoir 168 under the force of gravity. In the preferred embodiment illustrated in FIG. 2, there are actually two separate reservoirs 168, 170, each of which is designed to receive three bottles 164.

Furthermore, in order to stabilize and accommodate various bottle sizes and shapes, the preferred storage rack 104 includes bottle adapters 174 and vertically adjustable bottle brackets 166 associated with each reservoir opening 172. The bottle adapter 174 is a flexible sleeve that has a first end that fits over the neck of a bottle 164, and a second end that fits snuggly into the reservoir opening 172, thereby ensuring that the bottle 164 is received and held firmly within the opening 172.

The vertically adjustable bottle bracket 166 includes a vertical stem portion 166a and a curved arm 166b extending from and secured to the upper distal end of the stem portion 166a. The vertical stem portion 166a is mounted adjacent to the reservoir opening 172, with the curved arm 166b extending over and adapted to abut the bottom of an inverted bottle 164. By adjusting the height of the vertical stem portion 166a of the bracket 160, the curved arm 166b can be positioned to abut and apply downward pressure to the bottom of an inverted bottle 164 that is positioned in the reservoir opening 172, thereby stabilizing and securing the bottle 164.

Once one or more bottles 164 has been secured in the storage rack 104 in the inverted position, alcohol can flow from the bottles 164 and into the reservoirs 168, 170 under the force of gravity. Alcohol then flows from the reservoirs 168, 170 through a single reservoir outlet 176 and into tubing that carries the alcohol out of the ingredient cabinet 105, through the base cart partition 102, and to the mixing panel 101 where it may be combined with other beverage ingredients to form a single beverage product.

As a further refinement, although not clearly illustrated in the accompanying Figures, it is contemplated and preferred that the storage rack 104 described above be mounted on a sliding platform (e.g., through the use of common drawer slides) that may be pulled forward through the front door 182 of the base cart 100 to facilitate loading and unloading of the bottles 164. Furthermore, as mentioned above, the contents of the ingredient cabinet 105, including the bottles 164, are preferably viewable through a window 180 in the front door 182 of the base cart 100 so that a consumer can see what alcoholic beverage is being used in the beverage product, and an operator can see how full or empty the bottles 164 are. Additionally, the window 180 is preferably back-lit to enhance the viewing and consumer appeal.

Finally, although the storage rack 104 allows standard bottles to be used as a source of alcohol, alcohol could be stored in any number of receptacles or containers for subsequent transfer to the mixing panel 101 without departing from the spirit and scope of the present invention.

Figure 3:
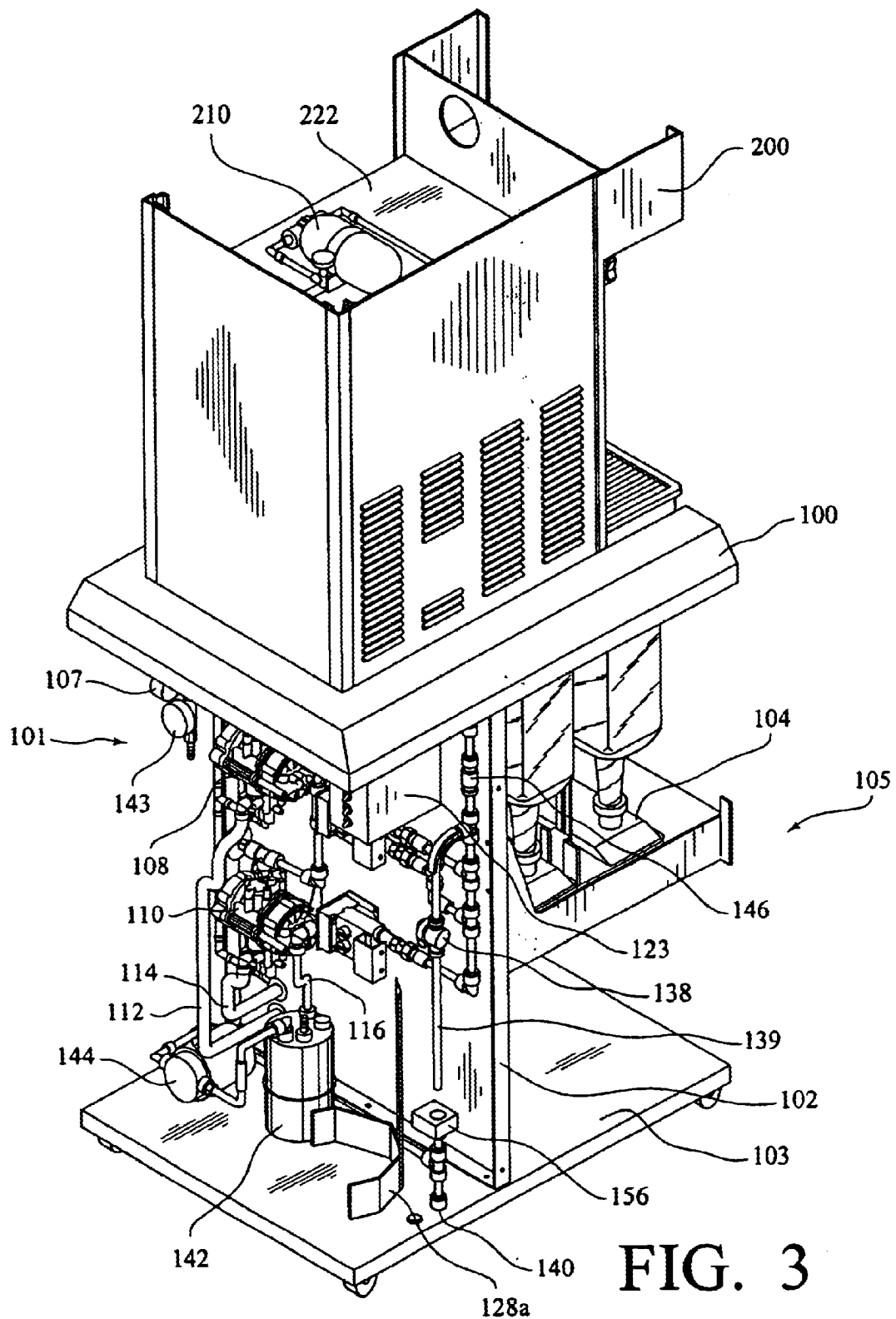
FIG. 3 is a rear perspective view of the dispenser of FIG. 1, with the outer housing of the dispenser removed to illustrate the internal components of the dispenser.
Figure 4:
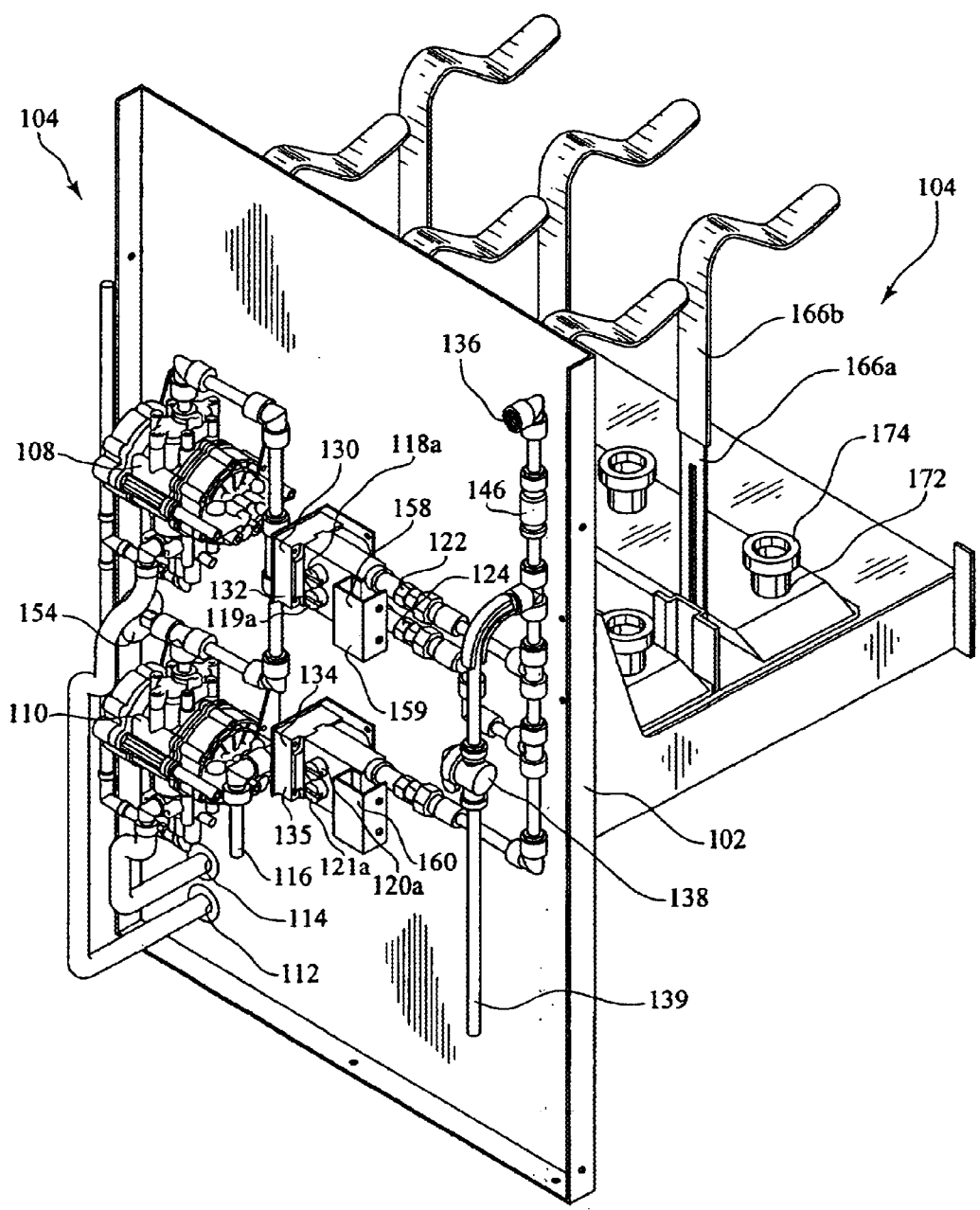
FIG. 4 is an enlarged perspective view of the mixing panel of the dispenser of FIG. 1.
Figure 8:
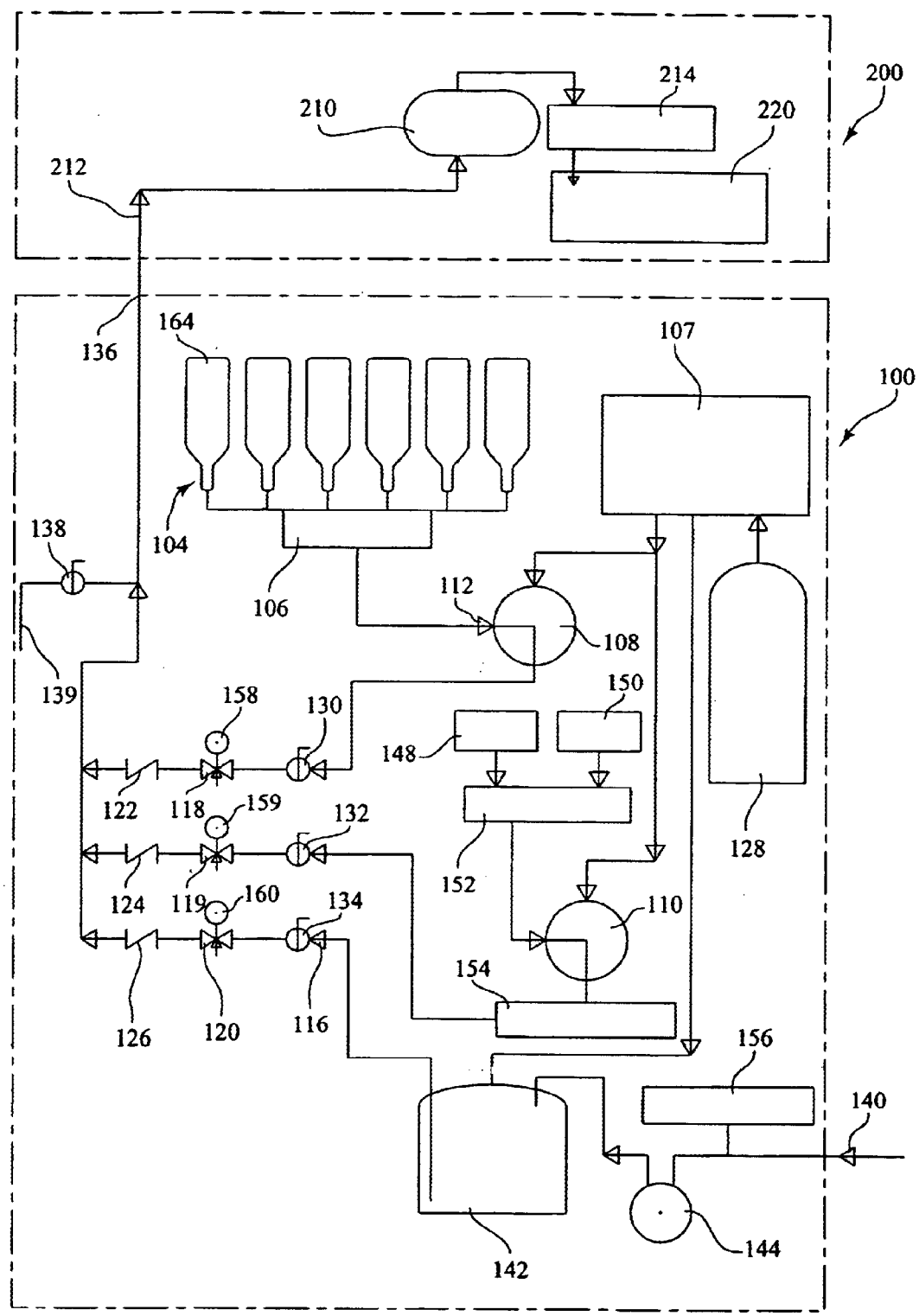
FIG. 8 is a flow diagram illustrating movement of the various liquids through the dispenser of FIG. 1.

Reference is now made to the perspective views of the mixing panel 101 of the dispenser of FIGS. 3–4, along with the flow diagram of FIG. 8, which illustrates movement of the various beverage components through the preferred dispenser 10. The mixing panel 101 includes the component feed systems and mixing apparatus that are responsible for producing a single beverage product suitable for processing into a frozen beverage.

First, as mentioned above, alcohol flows out of the ingredient cabinet 105, through the base cart partition 102, and to the mixing panel 101 at an inlet point 112, as shown in FIGS. 3, 4 and 8. Specifically, the alcohol is drawn into a gas-driven pump 108, which is powered by carbon dioxide gas (as is common in beverage dispensing systems). As illustrated in the flow diagram of FIG. 8, a regulator 107 preferably supplies gas from a carbon dioxide storage tank 128 to the pump at 60 psi. The alcohol is then pumped through a manual shutoff valve 130, an electric solenoid valve 158 with flow control 118, and a check valve 122, the function of each being described in further detail below. The alcohol exits the alcohol feed system and enters the mixing area 146 where it is combined with other beverage components for subsequent freezing and dispensing.

Although not shown in the FIG. 3, it is contemplated and preferred that the required carbon dioxide tank be positioned and stored in the base cart 100. Indeed, as illustrated in FIG. 3, the base cart 100 is preferably providing with a structure 128a for receiving and securing the carbon dioxide tank in front of the mixing panel 110.

Simultaneous with the flow of alcohol, the flavored liquid component from the ingredient cabinet 105 arrives at the mixing panel 101 at an inlet point 114. Much like the alcohol flow described above, the flavored liquid component is drawn into a gas-driven pump 110, which is powered by carbon dioxide gas. Again, as illustrated in the flow diagram of FIG. 8, the regulator 107 preferably supplies gas from the carbon dioxide storage tank 128 to the pump at 60 psi. The flavored liquid component is then pumped through its own set of valves, separate from those of the other component feed systems, including: a manual shutoff valve 132, an electric solenoid valve 159 with flow control 119, and a check valve 124, the function of each being described in further detail below. The flavored liquid component exits the feed system and enters the mixing area 146 where it is combined with other beverage components.

Referring again to FIG. 8, simultaneous with the flow of alcohol and flavored liquid component, the carbonated water feed system receives water from an external source through an inlet 140, and the water is drawn through a water booster pump 144 and then pumped through a carbonator 142 where it is supplied with carbon dioxide gas to carbonate the water. In this regard, the regulator 107 preferably supplies gas from the carbon dioxide storage tank 128 to the pump at 80 psi.

The carbonated water arrives at the mixing panel 101 illustrated in FIGS. 3–4 at an inlet point 116. The carbonated water is then pumped through its own set of valves, separate from those of the other component feed systems, including: a manual shutoff valve 134, an electric solenoid valve 160 with flow control, and a check valve 126, the function of each being described in further detail below. The carbonated water exits the feed system and enters the mixing area 146 where it is combined with other beverage components.

The function of the various valves contained in each component feed system will now be discussed. The manual shutoff valve 130, 132, 134 in each of the component feed systems may be manually closed to block the flow of a single component. For example, if the manual shutoff valve 130 of alcohol is closed, alcohol flow will be blocked, but the flow of the flavored liquid component and carbonated water will continue unabated. In this regard, a variety of circumstances can arise making it desirable to manually block flow of a particular component. For example, if troubleshooting a problem associated with a specific beverage component feed system, the appropriate manual shutoff valves 130, 132, 134 could be used to block flow of that particular component or to block flow of the other two components while the problem is investigated.

The electric solenoid valves 158, 159, 160 of the component feed systems are the primary control valves of the mixing panel 101 as they regulate flow of the beverage components during operation. Referring again to the flow diagram of FIG. 8, when these valves 158, 159, 160 are open, the pumps 108, 110, 144 move the beverage components through the respective feed systems; when closed, all movement of the beverage components is halted. As will be described further below with respect to the freezing and dispensing system 200, when the pressure is the freezing barrel 220 drops below 25 psi, the solenoid valves 158, 159, 160 open to allow for flow of the beverage components; otherwise, the solenoid valves 158, 159, 160 remain closed. The pressure in the freezing and dispensing system 200 triggering the opening of the solenoid valves 158, 159, 160 can be adjusted from about 15–100 psi, but is preferably 25 psi, as described above.

Furthermore, the flow control 118, 119, 120 associated with the electric solenoid valves 158, 159, 160 in each of the component feed systems can be adjusted to alter to flow rate of a particular component. For example, if desired, the relative flow rate of water could be adjusted to be greater then the other beverage components. Altering flow rates of the various components can change the relative ratios of those components, thereby altering the taste and/or the consistency of the final beverage product. As shown in FIGS. 3, 4, and 8, each flow control 118, 119, 120 includes a knob 118a, 119a, 120a having an indentation capable of receiving a specialized tool, which can be used to turn the knob. Turning the knob causes the opening or restricting of the passageway through the valve, thereby altering the flow rate. Although not illustrated in the accompanying Figures, when the desired adjustments have been made, a semi-permanent device may be inserted into the knob indentation to prevent reinsertion of the specialized tool and eliminating the ability to adjust the flow rate. Such a limitation is desirable in the ensuring that alcohol content is not easily manipulated.

Finally, the check valve 122, 124, 126 of each component feed system prevents the back flow of the respective beverage components through the solenoid valves 158, 159, 160.

Although not essential to the present invention, in the preferred embodiment illustrated in the accompanying Figures, there is the capacity for handling more then three liquid components in the mixing panel. As best illustrated in FIG. 4, there is an unused feed system comprised of a manual shutoff valve 135 and a solenoid valve 161 with flow control 121 which could be used for adding a fourth beverage component to the frozen beverage product. Of course, additional component feed systems could also be added to the dispenser 10 of the present invention to allow for even more beverage components without departing from the spirit and scope of the present invention.

After the individual beverage components—alcohol, a flavored liquid component, and water—have passed through the respective feed systems of the mixing panel 101, the components are introduced into and mixed in a common conduit or a mixing area 146. The mixed beverage then exits the base cart 100 at an outlet point 136 and is introduced into the freezing and dispensing system 200. The base cart and the freezing and dispensing system are separate components that may be mounted together or in different locations to allow for remote dispensing. If the two components are mounted in different locations, the mixed beverage would exit the base cart 100 at an outlet point 136 and flow through tubing before being introduced into the remotely located freezing and dispensing system 200.

Referring now to the perspective view of the preferred dispenser 10 of FIG. 2, the preferred freezing and dispensing system 200 contains all of the components needed to freeze and dispense a frozen alcoholic beverage with a desired consistency. The system 200 includes a standard freezer that is commonly used in frozen beverage dispensers, such as the freezer used in a Model 3311 Standard Beverage Freezer manufactured and distributed by Grindmaster Crathco Systems, Inc. of Louisville, Ky. (the assignee of the present invention). To the extent that the components of the Model 3311 Standard Beverage Freezer are used without modification in the preferred embodiment of the invention, they are not described in detail. For example, the compressor, condenser, condenser fan, evaporator, freezing and dispensing barrel 220 with rotatable scraper mounted inside (enclosed in insulation 222 in FIGS. 2–3), motor used to drive the scraper, and control system for the motor are all standard. Such a standard freezer is also described in co-pending U.S. application Ser. No. 10/000,793, which is incorporated herein by reference.

Figure 5:
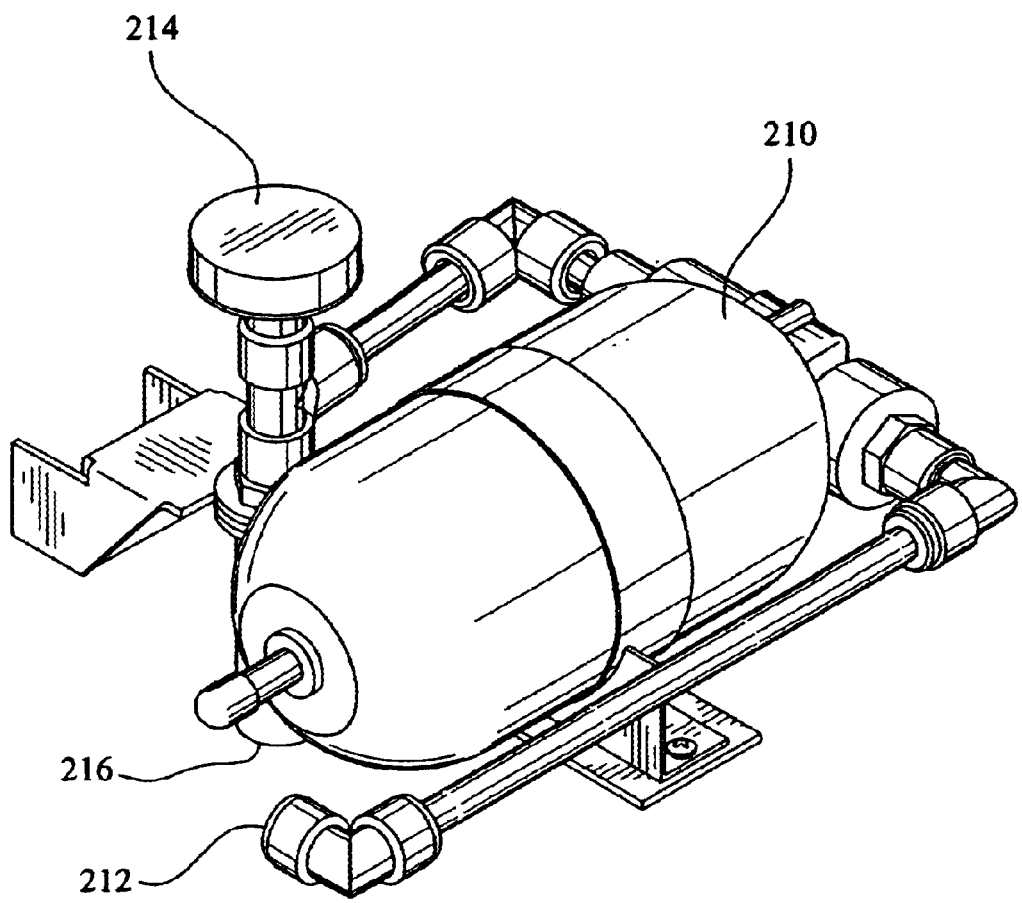
FIG. 5 is an enlarged perspective view of the accumulator of the dispenser of FIG. 1.
Figure 6:
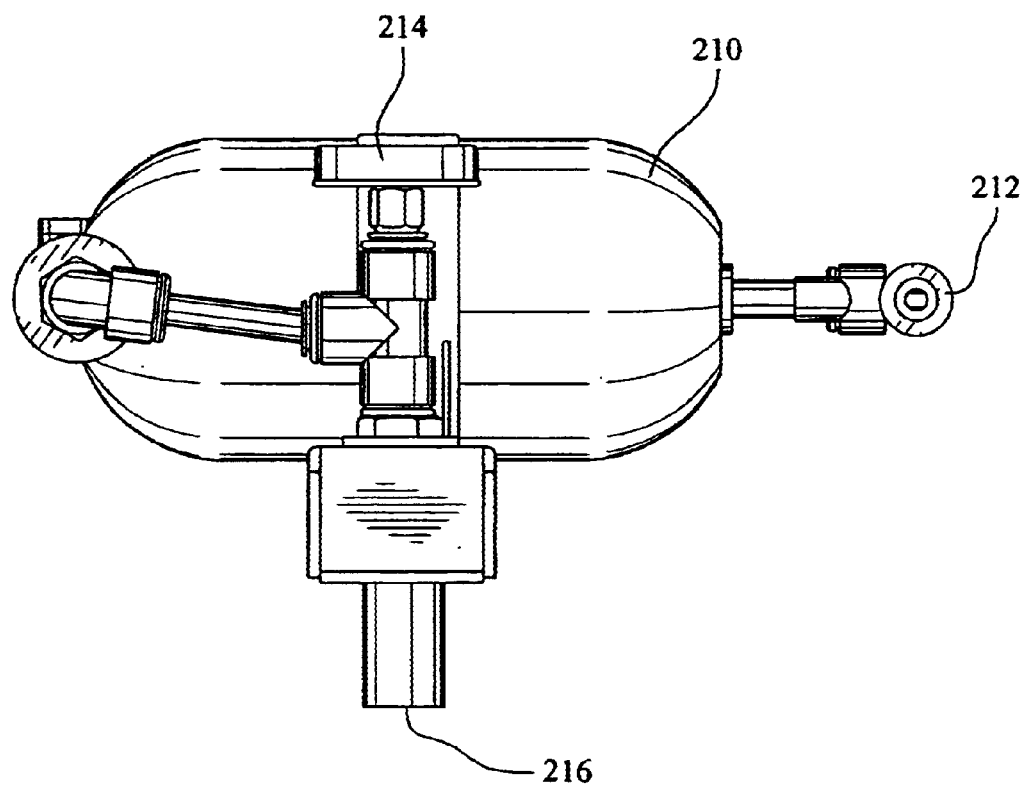
FIG. 6 is a side view of the accumulator of the dispenser of FIG. 5.

The freezing and dispensing system 200 also includes an accumulator 210, which is best described with reference to FIGS. 5, 6, and 8. The accumulator 210 receives mixed beverage from the mixing area 146 at an inlet 212. The accumulator 210 also has an outlet 216 in liquid communication with the freezing and dispensing barrel 220, as best shown in FIGS. 7A–7B to introduce mixed beverage into the freezing and dispensing barrel 220.

Figure 7:
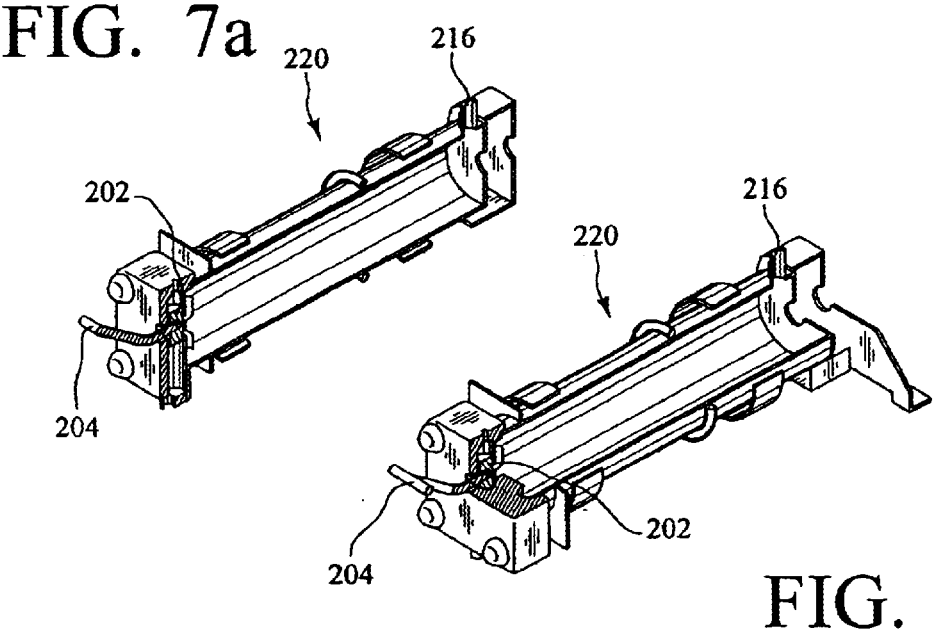
FIG. 7A is a side sectional view of the freezing and dispensing barrel of the dispenser of FIG. 1.
FIG. 7B is an alternate sectional view of the freezing and dispensing barrel of the dispenser of FIG. 1.

Referring now to FIGS. 7A–7B, the preferred freezing and dispensing barrel 220 includes a dispensing valve 202 at a distal end thereof operated by a handle 204. When the dispensing handle 204 is manually activated, it causes the dispensing valve 202 to open. The pressure in both the freezing and dispensing barrel 220 and the accumulator 210 is higher than atmospheric pressure; thus, when the dispensing valve 202 is opened, the frozen beverage product is expelled from through the dispensing valve 202 and out of the dispenser 10.

Simultaneous with this dispensing action, a volume of mixed beverage is drawn through the accumulator 210 and into the freezing and dispensing barrel 220 for freezing, resulting in a drop in pressure. A pressure switch 214, interposed between the accumulator 210 and the freezing and dispensing barrel 220, is activated when the pressure falls below approximately 20–27 psi, thus causing the electric solenoid valves 158, 159, 160 of the component feed systems to open, thereby replenishing the supply of the mixed beverage to the accumulator 210. The solenoid valves 158, 159, 160 remain open until the pressure returns to approximately 20–27 psi.

In this regard, it is important to recognize that traditional frozen beverage dispensers hold their product, prior to dispensing, at pressures between of approximately 35–45 psi. Pressures of these magnitudes are necessary to obtain large volume increases in the product when it is dispensed (e.g, 100% volume increase). While such volume increases are desired when dispensing a traditional frozen beverage, they would be deleterious to the palatability of an alcoholic frozen beverage. The frozen beverage product of the present invention can not be held at traditional beverage dispensing pressures prior to being dispensed and achieve the desired consistency and volume reduction capacity because it contains alcohol. Specifically, if the alcoholic frozen beverage product were to be dispensed at such pressures, carbon dioxide gas would rapidly escape from the beverage product, adversely affecting the consistency and palatability of the product. Accordingly, it is important to maintain a pressure of approximately 20–27 psi in the accumulator 210 and the freezing and dispensing barrel 220.

As a further refinement, and as best illustrated in FIG. 8, the preferred dispenser 10 is also provided with various switches, collectively referred to as "mix-out" switches, that are activated when a particular component has run out. Specifically, a float switch 106 is configured to close when there is no more alcohol in the reservoirs 168, 170 of the alcohol storage rack 104. Similarly, a pressure switch 154 is located between the pump 110 and the manual shutoff valve 132 in the flavored liquid component feed system that is activated when the contents of the liquid component containers 148, 150 are depleted, and a pressure switch 156 is located between the water inlet 140 and the water booster pump 144 that is activated when the water supply is cut off. Finally, a pressure switch 143 is configured to activate when the carbon dioxide supply from the carbon dioxide tank 128 is cut off. If one of these mix-out switches 106, 154, 156, 143 is activated, an appropriate signal is sent to the associated solenoid valve to prevent the valves from opening. Indeed, it is contemplated and preferred that all of the solenoid valves 158, 159, 160 would be prevented from opening, effectively preventing any further flow of any of the beverage components. At the same time, although not illustrated in the accompanying Figures, it is contemplated and preferred that activation of one or more of the mix-out switches 106, 154, 156, 143 also trigger an audio alarm or a visual alarm, such as a light on the front panel of the dispenser 10, signaling that a beverage component needs to be replenished.

Finally, the preferred dispenser 10 described herein allows for sampling of the mixed beverage or any components thereof prior to the freezing process. Specifically, samples for analysis can be collected from a sample port 139 that is in liquid communication with the mixing area 146. Samples are allowed to flow through the sample port 139 when a manual product-sampling valve 138 is opened. If a sample of only one component is desired, the manual shutoff valves 130, 132, 134 associated with the other two components can be closed during the sampling process.

As a further refinement, a timer may also be incorporated into the sampling system. Specifically, an electronic timer, activated using a switch 123 located near the mixing panel 101, as illustrated in FIG. 3, causes the electric solenoid valves 158, 159, 160 to open for a fixed period of time, allowing the beverage components to flow through of the respective feed systems, through the opened product sampling valve 138, and out of the sampling port 139 into a collection container of some sort. Of course, by adjusting the various manual shutoff valves 130, 132, 134, before activating the electronic timer, a separate sample of each ingredient can be collected. Thus, the volumes of each component sample can be measured and used to calculate ratios of one component to another.

Furthermore, maintenance of traditional frozen beverage dispensers includes collecting samples for Brix analysis, i.e., percentage of sugar in water. The appropriate Brix reading for a sugar and water mixture in a frozen beverage is about 15. Brix analysis of an alcoholic beverage mixture can not be made using traditional refractometers because the alcohol clouds the measurement causing an artificial reading. However, the sampling system of the present invention allows both Brix analysis, as well as alcohol ratio analysis.

Specifically, Brix analysis using the sampling system of the present invention can be conducted in one of two ways. First, the alcohol manual shutoff valve 130 may be closed to block alcohol flow. Then, when the electronic timer is activated to open the electric solenoid valves 158, 159, 160, a mixture will be dispensed from the sample port 139 containing only water and the flavored liquid component (e.g., syrup). Because this mixture will contain no alcohol, a traditional refractometer can be used to obtain a Brix reading on the water/syrup mixture. Alternatively, the various manual shutoff valves 130, 132, 134 can be adjusted to allow a separate sample of water and syrup to be collected in two consecutive activations of the timer. The volumes of the two samples can then be used to calculate the water to sugar ratio.

A variation of this second method can be used to measure the alcohol ratio, a measurement that is impossible to obtain using traditional refractometers. The syrup manual shutoff valve 132 and the carbonated water manual shutoff valve 134 can be closed to block flow of syrup and water so that only alcohol will flow out of the sample port 139 when the electronic timer is activated opening the electric solenoid valves 158, 159, 160. Similar samples of the other components can then be taken, and a volumetric ratio of alcohol to the other components can then be determined.

It will be obvious to those skilled in the art that further modifications may be made to the embodiments described herein without departing from the spirit and scope of the present invention.

What is claimed is:

1. A mixing, freezing and dispensing apparatus for mixing multiple beverage components into an alcohol-containing single beverage product and thereafter freezing the single beverage product and dispensing the single beverage product as a frozen alcoholic beverage, comprising:

a delivery system for delivery at least three separate beverage components, including a component containing a percentage of alcohol, said delivery system comprising a plurality of feed systems, each of said feed systems being associated with a respective beverage component and operating to feed a predetermined amount of the associated beverage component from a source thereof to mixing area in which the predetermined amounts are combined into the alcohol-containing single beverage product; and a freezing and dispensing system in liquid communication with said mixing area for freezing and thereafter dispensing the frozen alcoholic beverage, said delivery system responsive to said freezing and dispensing system upon dispensing the alcoholic beverage for feeding the predetermined amounts of the beverage components to the mixing area.

2. The apparatus of claim 1 wherein each of said feed systems includes a first valve and said freezing and dispensing system includes a first sensing mechanism for sensing the dispensing of the frozen alcoholic beverage, all of said first valves opening when the frozen alcoholic beverage is dispensed for feeding the predetermined amounts of the beverage components to said mixing area, thereby replenishing the single beverage product in the freezing and dispensing system.

3. The apparatus of claim 2 wherein said first sensing mechanism senses a change in pressure within said freezing and dispensing system.

4. The apparatus of claim 2 wherein each of said feed system includes a second sensing mechanism for sensing the presence of the associated beverage component, all of said first valves being disabled when any of said second sensing mechanisms sense the absence of the associated beverage component.

5. The apparatus of claim 4 wherein said second sensing mechanism is a pressure switch.

6. The apparatus of claim 4 where in said second sensing mechanism is a float switch.

7. The apparatus of claim 1 wherein each of feed systems includes flow control for adjusting the flow rate of the associated beverage component, thereby allowing alteration of the composition of the resulting single beverage product.

8. The apparatus of claim 7 wherein each of said feed systems includes a locking device for selectively disabling said flow controls.

9. The apparatus of claim 1, and further comprising a second valve between the mixing area and the freezing and dispensing system for sampling the beverage components, the second valve, in its open state, diverting the flow from the mixing area into a container for sampling of the diverted beverage component.

10. The apparatus of claim 1 wherein each of said feed systems includes a third valve for shutting off the flow of the associated beverage component, said third valve, in its closed state, blocking the delivery of the associated beverage component whether said first valve is in its open or closed state.

11. The apparatus of claim 1, and further comprising a timer, all of said first valves responsive to a signal from said timer for remaining open for a predetermined period of time.

12. The apparatus of claim 1 wherein the freezing and dispensing system comprises a freezing and dispensing barrel and a connected accumulator for storing a portion of the alcohol containing single beverage product that has expanded beyond the volume capacity of the barrel, the barrel and accumulator holding the alcohol containing single beverage product at a pressure between about 15 and 30 PSI until the single beverage product is dispensed as a frozen alcoholic beverage.

13. A mixing, freezing and dispensing apparatus for mixing multiple beverage components into an alcohol-containing single beverage product and thereafter freezing the single beverage product and dispensing the single beverage product as a frozen alcoholic beverage, comprising:

a freezing-and-dispensing system for freezing and thereafter dispensing the single beverage product, holding the single beverage produce at a pressure between about 15 and 30 PSI until the single beverage product is dispensed as a frozen alcoholic beverage.

14. The apparatus of claim 13 wherein the freezing-and-dispensing system holds the single beverage product at a pressure between about 20 and 27 PSI until the single beverage product is dispensed as a frozen alcoholic beverage.

15. The apparatus of claim 13 wherein the freezing-and-dispensing system holds the single beverage product at a pressure of about 25 PSI until the single beverage product is dispensed as a frozen alcoholic beverage.

16. The apparatus of claim 13 wherein the freezing-and-dispensing system comprises a freezing and dispensing barrel and an accumulator, connected to the barrel, for storing a portion of the single beverage product that has expanded beyond the volume capacity of the barrel, the barrel and accumulator holding the single beverage product at a pressure between about 15 and 30 PSI until the single beverage product is dispensed as a frozen alcoholic beverage.

17. The apparatus of claim 16 wherein the accumulator is a bladder-type device.

18. The of claim 13, and further comprising a delivery system for delivery at least three separate beverage components, including a component containing a percentage of alcohol, said delivery system comprising a plurality of feed systems, each of said feed systems being associated with a respective beverage component and operating to feed a predetermined amount of the associated beverage component from a source thereof to a mixing area in which the predetermined amounts are combined into the alcohol-containing single beverage product, said freezing and dispensing system in liquid communication with said mixing area, said delivery system responsive to said freezing and dispensing system upon dispensing the single beverage product as a frozen alcoholic beverage for feeding the predetermined amounts of the beverage components to the mixing area.

19. The apparatus of claim 18 wherein each of said feed systems include a first valve and said freezing and dispensing system comprises a first sensing mechanism for sensing the dispensing of the frozen alcoholic beverage, all of said first valves opening when the frozen alcoholic beverage is dispensed for feeding the predetermined amounts of the beverage components to said mixing area, thereby replenishing the single beverage product in the freezing and dispensing system.

20. The apparatus of claim 19 wherein said first sensing mechanism senses a change in pressure within said freezing and dispensing system.

21. The apparatus of claim 18 wherein each of said feed systems includes:

a second sensing mechanism for sensing the presence of the associated beverage component, all of said first valves being disabled when any of said second sensing mechanisms sense the absence of the associated beverage component;

flow control for adjusting the flow rate of the associated beverage component, thereby allowing alteration of the composition of the resulting single beverage product, and the flow control including a locking device for selectively disabling said flow controls; and a third valve for shutting off the flow of the associated beverage component, said third valve, in its closed state, blocking the delivery of the associated beverage component whether said first valve is in its open or closed state.

22. The apparatus of claim 21 wherein said second sensing mechanism is a pressure switch.

23. The apparatus of claim 21 where in said second sensing mechanism is a float switch.

24. the apparatus of claim 18, and further comprising a second valve between the mixing area and the freezing and dispensing system for sampling the beverage components, the second valve, in its open state, diverting the flow from the mixing area into a container for sampling of the diverted beverage component; and a timer, all of said first valves responsive to a signal from said timer for remaining open for a predetermined period of time.

25. The system of claim 18 in which the freezing-and-dispensing system is in liquid communicating with but located separate and apart from said delivery system.

26. The system of claim 18 wherein said source of the alcohol-containing beverage component is at least one inverted bottle held in a bottle rack connected to a reservoir, said source of the alcohol-containing beverage component being inside a locked cabinet.

27. The system of claim 26 wherein said cabinet includes a back-lit window through which the beverage component can be viewed.

28. A mixing, freezing and dispensing apparatus for mixing multiple beverage components into an alcohol-containing single beverage product and thereafter freezing the single beverage product and dispensing the single beverage product as a frozen alcoholic beverage, comprising:

a delivery system for delivery at least three separate beverage components, including a component containing a percentage of alcohol, said delivery system comprising a plurality of feed systems, each of said feed systems being associated with a respective beverage component and operating to predetermined amount of the associated beverage component from a source thereof to a mixing area in which the predetermined amounts are combined into the alcohol-containing single beverage product; and a freezing and dispensing system in liquid communication with said mixing area for freezing and thereafter dispensing the frozen alcoholic beverage, said delivery system responsive to said freezing and dispensing system upon dispensing the frozen alcoholic beverage for feeding the predetermined amounts of the beverage components to the mixing area, and each of said feed systems further comprising a first valve and said freezing and dispensing system comprising a first sensing mechanism for sensing the dispensing of the frozen alcoholic beverage, all of said first valves opening when the frozen alcoholic beverage is dispensed for feeding the predetermined amounts of the beverage components to said mixing area, thereby replenishing the single beverage product in the freezing and dispensing system.

29. The apparatus of claim 28 wherein said first sensing mechanism senses a change in pressure within said freezing and dispensing system.

* * * * *

UNITED STATES PATENT AND TRADEMARK OFFICE
CERTIFICATE OF CORRECTION

PATENT NO.   : 6,745,592 B1
DATED        : June 8, 2004
INVENTOR(S)  : Michael J. Edrington and Richard L. Sipp It is certified that error appears in the above-identified patent and that said Letters Patent is hereby corrected as shown below:

Column 9,
Line 57, add the word -- of -- between the words "delivery" and "at"
Line 64, add the word -- a -- between the words "to" and "mixing"

Column 11,
Line 1, change "produce" to -- product --
Line 25, add the word -- of -- between the words "delivery" and "at"

Column 12,
Line 34, add the word -- of -- between the words "delivery" and "at"
Line 39, add the words -- feed a -- between the words "to" and "predetermined"

Signed and Sealed this

Sixteenth Day of November, 2004

JON W. DUDAS
*Director of the United States Patent and Trademark Office*